(12) United States Patent
Dister (10) Patent No.: US 6,246,193 B1
(45) Date of Patent: Jun. 12, 2001

(54) ENCODERLESS ROTOR POSITION DETECTION METHOD AND APPARATUS

(75) Inventor: Carl J. Dister, North Olmsted, OH (US)

(73) Assignee: Tridelta Industries, Inc., Mentor, OH (US)

( * ) Notice: Subject to any disclaimer, the term of this patent is extended or adjusted under 35 U.S.C. 154(b) by 0 days.

(21) Appl. No.: 09/383,520

(22) Filed: Aug. 26, 1999

(51) Int. Cl.⁷ ................................. H02P 1/04; H02P 5/40
(52) U.S. Cl. .......................... 318/254; 318/138; 318/439; 318/721
(58) Field of Search .................................. 318/701–839; 310/165, 162, 180, 166

(56) References Cited

U.S. PATENT DOCUMENTS

| | | | |
|---|---|---|---|
| 4,088,934 | * 5/1978 | D'Atre et al. | 318/227 |
| 4,088,935 | * 5/1978 | D'Atre et al. | 318/227 |
| 5,051,680 | 9/1991 | Belanger | 318/701 |
| 5,144,564 | * 9/1992 | Naidu et al. | 318/721 |
| 5,159,246 | 10/1992 | Ueki | 318/254 |
| 5,196,775 | * 3/1993 | Harris et al. | 318/638 |
| 5,497,064 | 3/1996 | Van Sistine | 318/701 |
| 5,719,453 | * 2/1998 | Horst | 318/716 |
| 5,729,113 | * 3/1998 | Jansen et al. | 318/799 |
| 5,736,846 | 4/1998 | Floru et al. | 324/127 |
| 5,811,905 | * 9/1998 | Tang | 318/701 |
| 5,841,621 | 11/1998 | Dean et al. | 361/185 |
| 5,854,548 | * 12/1998 | Taga et al. | 318/721 |
| 5,866,964 | * 2/1999 | Li | 318/701 |
| 5,929,590 | * 7/1999 | Tang | 318/701 |
| 6,051,946 | * 4/2000 | Yamada et al. | 318/432 |
| 6,078,122 | * 6/2000 | Tang et al. | 310/165 |

FOREIGN PATENT DOCUMENTS

| | | |
|---|---|---|
| 1 014 556 | 6/2000 | (EP) . |
| 2319908 | 6/1998 | (GB) ................. H02P/1/16 |
| WO 00/27022 | 5/2000 | (WO) . |

* cited by examiner

Primary Examiner—Paul Ip
(74) Attorney, Agent, or Firm—Arter & Hadden LLP (57) ABSTRACT

A rotating flux vector is set up in a motor or generator's rotor by simultaneously energizing two phase windings while the rotor remains stationary, wherein each phase winding may be energized by the same or different excitation voltages. Respective tap voltages are then recorded at this first flux position. Thereafter, the two phase windings are simultaneously energized by another voltage excitation, wherein each phase is energized at the same or different voltages, causing a new flux position to occur. Once again, respective tap voltages are recorded. This process may be repeated for various rotations of the motor's flux. The measured tap voltages are evaluated to determine the location of the rotor, without actually moving it. The present invention is applicable to SR and non-SR machines having a plurality of phases and pole configurations.

41 Claims, 10 Drawing Sheets

ENCODERLESS ROTOR POSITION DETECTION METHOD AND APPARATUS

FIELD OF INVENTION

The present invention generally relates to a method and apparatus for detecting the position of a rotor, and more particularly to a method and apparatus for detecting the position of a rotor without the use of an encoder.

BACKGROUND OF THE INVENTION

Traditional methods of rotor position estimation in a switched reluctance (SR) motor usually involve either: (1) injection of a signal into one of the phase windings during rotational movement, and identifying the resulting impedance using current sensors and/or flux sensors, or (2) bringing the rotor into alignment on a torque null position, then identifying impedance using the currents and fluxes inherent in the firing of the winding to determine impedance. These approaches have significant drawbacks. In this regard, a lookup table of impedance (inductance, core loss, resistance, capacitance, etc.) is used to find the starting position of the rotor. Moreover, movement may possibly be in a rotation direction opposite of that desired. Furthermore, a period of time must elapse for the position to stabilize before starting, depending upon the load friction and inertia, as well as any other connected load effects (e.g., damping).

One significant drawback to the foregoing methods is the need to use costly current sensors and/or flux sensors. Another drawback to these methods is that they are sensitive to the temperature of the motor and the applied line voltage.

It is recognized that tap voltages, as described in related U.S. patent application Ser. No. 09/257,867, now U.S. Pat. No. 6,150,778, and assigned to the assignee of the present application, may be utilized to determine rotor position. However, the system described in such patent application is best suited for determining rotor position after the rotor has begun spinning at a relatively high speed. It has been observed that the system is less suited for lower motor speeds, stopped or stalled motors, and during speed transients.

The present invention extends the concepts described in the prior patent application with regard to tap voltages signals, to provide an encoderless position detection method and apparatus which determines rotor position when the rotor is stationary.

SUMMARY OF THE INVENTION

According to the present invention there is provided a method for detecting the position of a rotor relative to the position of a stator, in a salient pole machine having N phases. The method includes the steps of simultaneously energizing the N phases with a respective plurality of excitation voltages, to form one or more flux patterns representable by one or more flux vectors; and evaluating said one or more flux vectors to determine a rotor position.

According to another aspect of the present invention there is provided a system for detecting the position of a rotor relative to the position of a stator, in a salient pole machine having N phase windings. The system comprises switching means for simultaneously energizing said N phase windings with one or more respective excitation voltages, wherein each said N phase winding includes a plurality of coil sets; and evaluation means for evaluating one or more flux vectors resulting from said one or more respective excitation voltages, to determine rotor position.

According to another aspect of the present invention there is provided a method for detecting the position of a rotor relative to the position of a stator in a salient pole machine, without moving the rotor. This method includes the steps of: simultaneously energizing a first and second phase winding with a respective first and second excitation voltage, to form a first flux pattern representable by a first flux vector; simultaneously energizing the first and second phase winding with a respective third and fourth excitation voltage, to form a second flux pattern representable by a second flux vector; and evaluating said first and second flux vectors to determine a rotor position.

According to another aspect of the present invention there is provided a method for detecting the position of a rotor relative to the position of a stator in a salient pole machine, without moving the rotor. This method includes the steps of: simultaneously energizing a first and second phase winding with a respective first and second excitation voltage, wherein each said phase winding includes a plurality of coil sets; measuring a first pair of tap voltages respectively associated with a coil set of the first winding and a coil set of the second winding; simultaneously energizing the first and second phase winding with a respective third and fourth excitation voltage; measuring a second pair of tap voltages respectively associated with a coil set of the first winding and a coil set of the second winding; and determining the position of the rotor based upon said first and second pair of tap voltages.

According to another aspect of the present invention there is provided a system for detecting the position of a rotor relative to the position of a stator in a salient pole machine, without moving the rotor. The system comprising: switching means for simultaneously energizing a first and second phase winding with a respective first and second excitation voltage, wherein each said phase winding includes a plurality of coil sets; sampling means for measuring a first pair of tap voltages respectively associated with a coil set of the first winding and a coil set of the second winding; switching means for simultaneously energizing the first and second phase winding with a respective third and fourth excitation voltage; sampling means for measuring a second pair of tap voltages respectively associated with a coil set of the first winding and a coil set of the second winding; and means for determining a rotor position based upon said first and second pair of tap voltages.

According to another aspect of the present invention there is provided a system for detecting the position of a rotor relative to the position of a stator, comprising: first flux generation means for generating a first flux pattern representable by a first flux vector; second flux generation means for generating a second flux pattern representable by a second flux vector; and evaluation means for evaluating said first and second flux vectors to determine a rotor position.

An advantage of the present invention is the provision of an encoderless rotor position detection method and apparatus, which is suitable for detecting rotor position with the rotor in a stationary condition (e.g., stall or start).

Another advantage of the present invention is the provision of an encoderless rotor position detection method and apparatus, which can determine rotor position of SR and non-SR motors having either regular or irregular pole configurations.

Another advantage of the present invention is the provision of an encoderless rotor position detection method and apparatus, which does not require the use of current sensors.

Another advantage of the present invention is the provision of an encoderless rotor position detection method and apparatus, which does not require the use of flux sensors.

Still another advantage of the present invention is the provision of an encoderless rotor position detection method and apparatus, which is not sensitive to the temperature of the motor.

Still another advantage of the present invention is the provision of an encoderless rotor position detection method and apparatus, which is not sensitive to the applied line voltage.

Yet another advantage of the present invention is the provision of an encoderless rotor position detection method and apparatus, which is suitable for detecting rotor position for a salient pole machine, including switched reluctance (SR) machines and synchronous machines.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
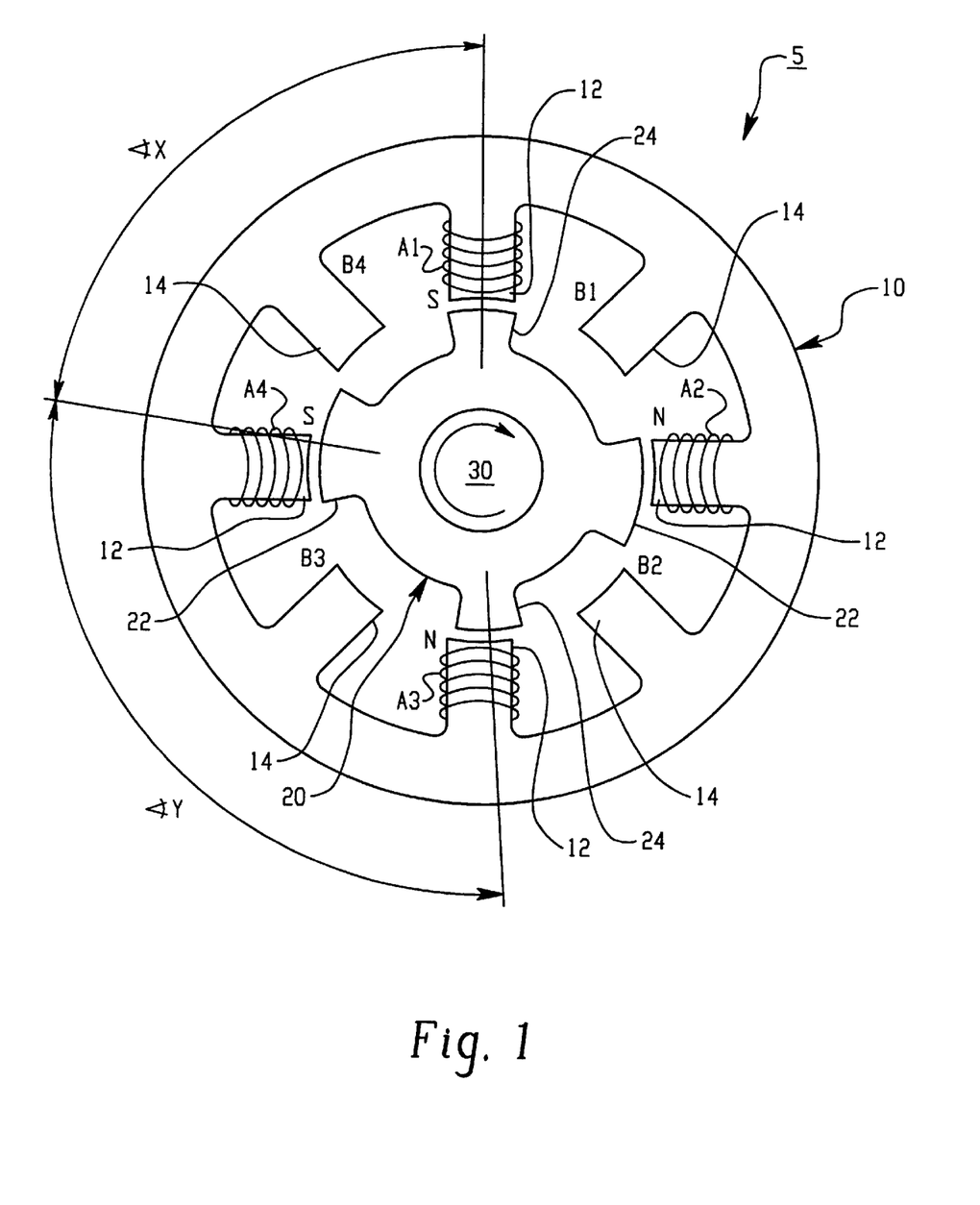
FIG. 1 illustrates an exemplary 2-phase SR machine having an irregular pole configuration.

Referring now to the drawings wherein the showings are for the purposes of illustrating a preferred embodiment of the invention only and not for purposes of limiting same, FIG. 1 shows an exemplary SR motor 5 having stator coils (i.e., windings). These windings may be arranged in either series, parallel or combinations thereof (e.g., for higher multiplicity motors).

The particular SR machines described herein are shown solely for the purpose of illustrating the present invention. It should be appreciated that the term "switched reluctance," as used herein, is also intended to include "variable reluctance" and "synchronous reluctance." Furthermore, while the present invention is described with particular reference to a switched reluctance motor, the concepts embodied in the present invention are equally applicable to a switched reluctance generator.

In addition, it should be appreciated that the present invention is suitable for use in connection with SR machines having various types of "irregular pole configurations," as well as regular-shaped or standard pole configurations. It will be understood that the term "irregular pole configurations" includes pole configurations wherein at least one rotor pole or stator pole has a physical geometric characteristic (e.g. dimension, size, shape, width/pole arc, etc.) that differs from a physical geometric characteristic of one or more other rotor pole or stator teeth. Consequently, in the case of pole configurations, there is provided a coil or coils which have a unique inductance as a function of rotor position. This property facilitates the generation of accurate ratiometric determination of rotor position. The unique inductance results from having a different "air gap" between rotor and stator at strategic rotor positions. It will be understood that poles having different widths (e.g., a pair of narrow poles and a pair of wide poles) and/or steps will cause the coils to "see" different sized air gaps, as the rotor rotates. Furthermore, it is noted that even small irregularities, e.g., slightly different rotor arcs, may cause one tooth pair to overlap "pre-maturely," which results in a detectable signal from the voltage divider principle. In cases where there are multiple occurrences of a particular inductance, the ambiguity may be resolved by obtaining information from one or more other phases.

It should be further appreciated that the term "irregular pole configurations" not only refers to poles with irregular physical properties (as discussed above), but also refers to poles having irregularities in material properties, such as permeability. Properties such as permeability, can also be utilized to obtain a unique inductance profile at a given rotor position. The irregular pole configurations among rotor poles and stator poles can be utilized to obtain rotor position information in accordance with the present invention.

Furthermore, it should be understood that the concepts embodied in the present invention are not limited to SR machines, but are also applicable to other types of salient pole machines, including, but not limited to, synchronous motors and generators.

SR Motor 5 is generally comprised of a stator 10 and a rotor 20, which is mounted to a shaft 30. Stator 10 includes stator pole sets 12 and 14. Stator pole set 12 corresponds to a first phase ("phase A"), while stator pole set 14 corresponds to a second phase ("phase B"). Rotor 20 includes a first pair of rotor poles 22, and a second pair of rotor poles 24. It should be noted that rotor poles 22 and 24 have different polar arc dimensions, in terms of both width and position.

Each stator pole 12 and 14 is surrounded by a winding of one or more turns of electrically conductive material and appropriate insulation. Stator poles 12 are associated with "phase A" windings, while stator poles 14 are associated with "phase B" windings. It should be noted that for the purpose of clarity, the windings for stator poles 14 are not shown.

Figure 2:
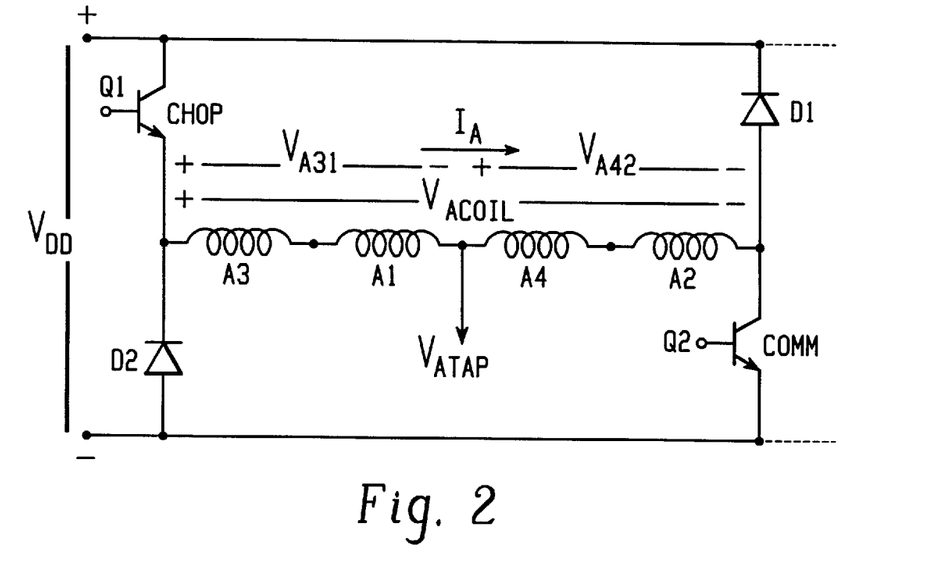
FIG. 2 is a generally idealized schematic of a conventional asymmetric half-bridge controller circuit arrangement, wherein the coils of the phase winding are in series.

In accordance with an exemplary embodiment of the present invention, coils A3 and A1 form a first pair of series-connected windings for phase A, while coils A4 and A2 form a second pair of series-connected windings for phase A. Collectively, coils A1, A2, A3 and A4 are referred to as the "phase A windings." FIG. 2 illustrates a generally idealized asymmetric half-bridge controller circuit arrangement, wherein the coils of the phase A winding are in series. While the present invention will be further described in connection with the circuit arrangement shown in FIG. 2, the present invention is also applicable to suitable "series/parallel" circuit arrangements. It should be appreciated that a series/parallel arrangement may be preferred for high speed motors, since the inductance is lower, while a series arrangement may be preferred for low speed motors. Although, a series arrangement could also be scaled by the number of turns, to reduce the inductance.

Coils B1, B2 and B3, B4 (not shown) located on stator poles 14, respectively form the first and second pair of windings for the second phase (i.e., phase B). Collectively, coils B1, B2, B3 and B4 are referred to as the "phase B windings". It should be understood that the generally idealized asymmetric half-bridge controller circuit arrangements shown in FIG. 2 also includes circuitry for phase B windings (not shown) that is analogous to the circuitry for the phase A windings.

In the exemplary SR machine disclosed herein, the phase A and phase B windings are alternately disposed on every other stator pole and are wound such that for every pole of one polarity there is a corresponding pole of an opposite polarity. Accordingly, the stator poles 12 associated with coils A1 and A2 have opposite polarity, while the stator poles 12 associated with coils A3 and A4 have opposite polarity. The stator poles 14 associated with coils B1, B2, B3 and B4 are likewise arranged. It should be appreciated that the phase A and phase B windings may be arranged in other suitable configurations. For instance, the phase A and phase B windings may be overlapped with each other on a single pole (e.g., 10% phase A windings, and 90% phase B windings on the same pole, or vice versa).

Rotor poles 22,24 are disposed unevenly about the circumference of rotor 20. In this regard, the angle X between rotor poles is not equal to the angle Y between rotor poles. Moreover, the faces of wide rotor poles 22 span an angle greater than the faces of the narrow rotor poles 24. In the exemplary embodiment shown in FIG. 1, at the circumference of rotor 20, the face of wide rotor poles 22 are approximately twice as wide as the face of the narrow rotor poles 24. At the inside circumference of the stator, the face of the stator poles 12, 14 are approximately the same width as the face of the narrow rotor poles 24 and the distance between adjacent stator poles 12, 14 is approximately the width of a stator pole.

The phase A and phase B windings are grouped together so that a uniform balanced torque is produced in the motor when the windings are excited from an external source of electrical energy and also so that voltage and current requirements of the external energy source are satisfied. A variation in reluctance (and likewise inductance) of all phase A windings occurs when rotor 20 is rotated with respect to stationary stator poles 12 and 14. The variation in reluctance (and likewise inductance) is the result of the variation in the size of the effective net air gap between the stator pole and the rotor pole of all the phase A windings.

Torque in an SR motor is related to changing inductance of energized phase windings as a function of rotor position ($dL/d\theta$). Inductance in an SR motor increases or decreases as the poles of the rotor move into or out-of alignment with the poles associated with the energized stator windings, i.e., as the rotor-stator system moves in or out-of a minimum reluctance position. In other words, torque is produced when there is a change in inductance as a function of angular position, i.e., $dL/d\theta$; positive torque being produced in the regions where the inductance of an energized phase increases, and negative torque being produced in the regions where the inductance of an energized phase decreases ($-dL/d\theta$).

As is well understood by those skilled in the art, the phase A and phase B windings are selectively energized and deenergized. Energization of the respective phase windings produces a torque on rotor 20, causing rotor 20 to align rotor poles with the stator poles associated with the excited phase windings. It is to be appreciated that an increasing or decreasing inductance of a phase winding will correspond to the respective decreasing or increasing reluctance in the magnetic flux path associated with the phase winding. A detailed description of the operation of an SR motor, such as motor 5, is found in U.S. application Ser. No. 08/545,085, now U.S. Pat. No. 5,852,334, which is fully incorporated herein by reference.

The switching or "excitation" of the phase windings is typically accomplished by solid state switching devices such as MOSFETS, transistors, thyristors, insulated gate bipolar transistors (IGBTs), and the like, including combinations thereof. The switching sequence of the solid state switching devices is typically determined by a "logic system" comprised of electronic circuits, that are responsive to various sensors which sense parameters such as voltage levels, current levels in the windings, the position of the rotor poles relative to the stator poles, or other signals necessary for proper operation of the motor.

Referring now to FIG. 2, coils A3 and A1 are a first pair of series-connected windings for phase A, while coils A4 and A2 are a second pair of series-connected windings for phase A. A voltage $V_{ATAP}$ is measured across coils A4 and A2. In accordance with the inductive voltage divider principle utilized by the present invention, the sum of: (1) $V_{A31}$ (i.e., the voltage across coils A3 and A1) and (2) $V_{ATAP}$ is equal to the excitation voltage (i.e., supply voltage $V_{DD}$), neglecting voltage drops across the switches. Thus, voltage $V_{A31}$ is complementary to voltage $V_{ATAP}$. $V_{DD}$ is the bus or excitation voltage applied across the phase A winding during phase A excitation, for both positive voltage loop (PVL) and negative voltage loop (NVL) conditions.

The ratio of the inductances between coils A3, A1 and coils A4, A2 gives rise to a proportioning of the applied excitation voltage ($V_{DD}$), as well as any generated back-EMF. By sampling the voltage $V_{ATAP}$ across coils A4 and A2, and comparing it to the simultaneous voltage $V_{A31}$ across coils A3, A1, the position of the rotor can be inferred. In addition, the position of the rotor can be inferred by making a "single-ended" comparison to a reference voltage derived from the supply voltage $V_{DD}$. In this regard, voltage $V_{ATAP}$ may be compared to a value proportional to $V_{DD}$ (e.g., $0.5V_{DD}$), as will be described in further detail below.

As can be readily mathematically derived, $V_{ATAP}=V_{DD}[L_{A42}/(L_{A31}+L_{A42})]$ where $L_{A42}$ is the total inductance of coils A4 and A2 and $L_{A31}$ is the total inductance of coils A3 and A1. Accordingly, the idealized schematic of FIG. 2 simplifies the circuit components to a series combination of two inductors, namely $L_{A42}$ and $L_{A31}$.

While the generally idealized schematic shown in FIG. 2 is suitable for describing the system control circuitry when the rotor is rotating at relatively high speeds, the idealized schematic may be deficient in describing the control circuitry when the rotor is rotating at relatively low speeds, and when the rotor is starting from a stopped position at startup or following a stall condition.

Figure 3:
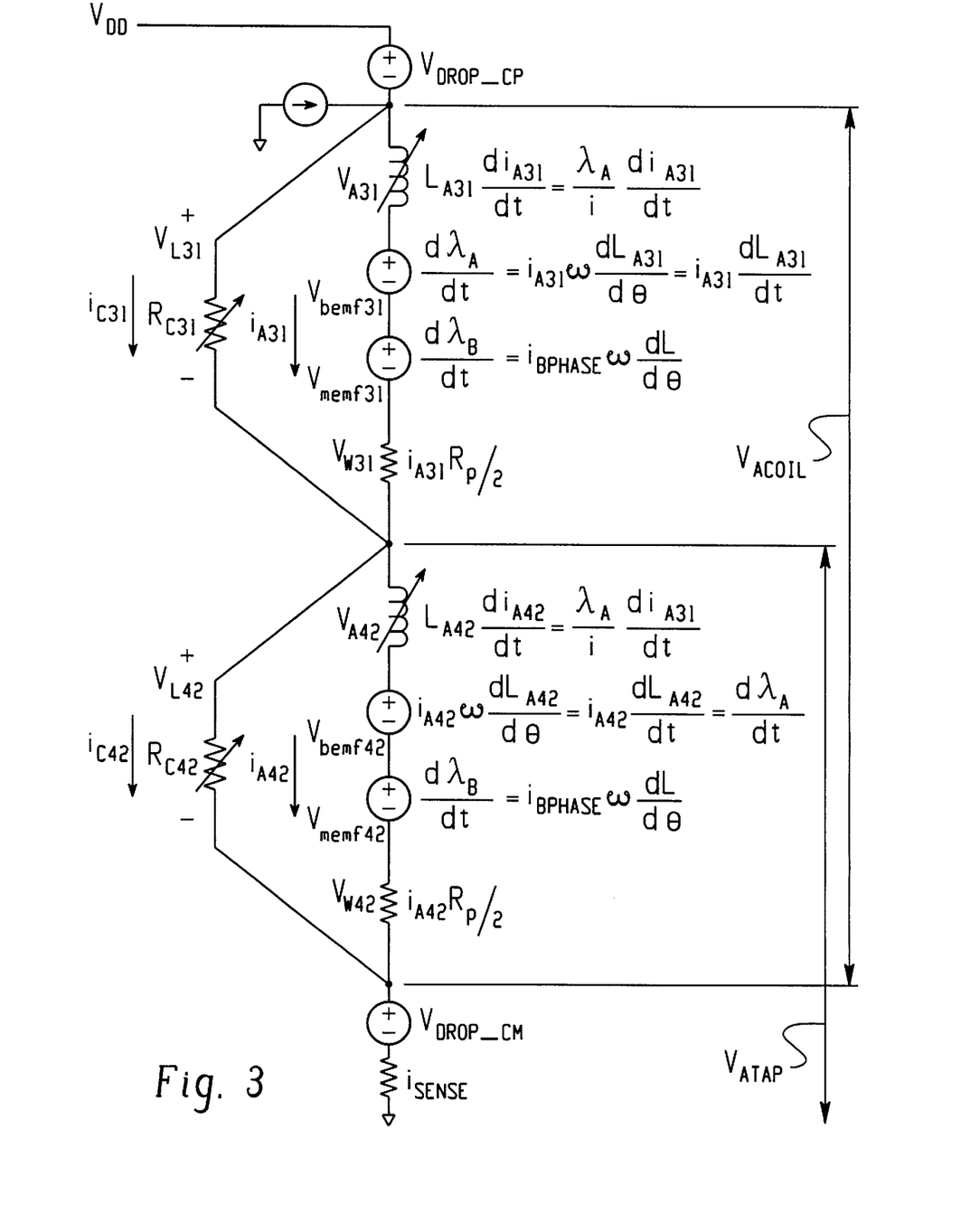
FIG. 3 is a phase equivalent circuit of the schematic shown in FIG. 2, wherein all circuit elements are shown.
Figure 4:
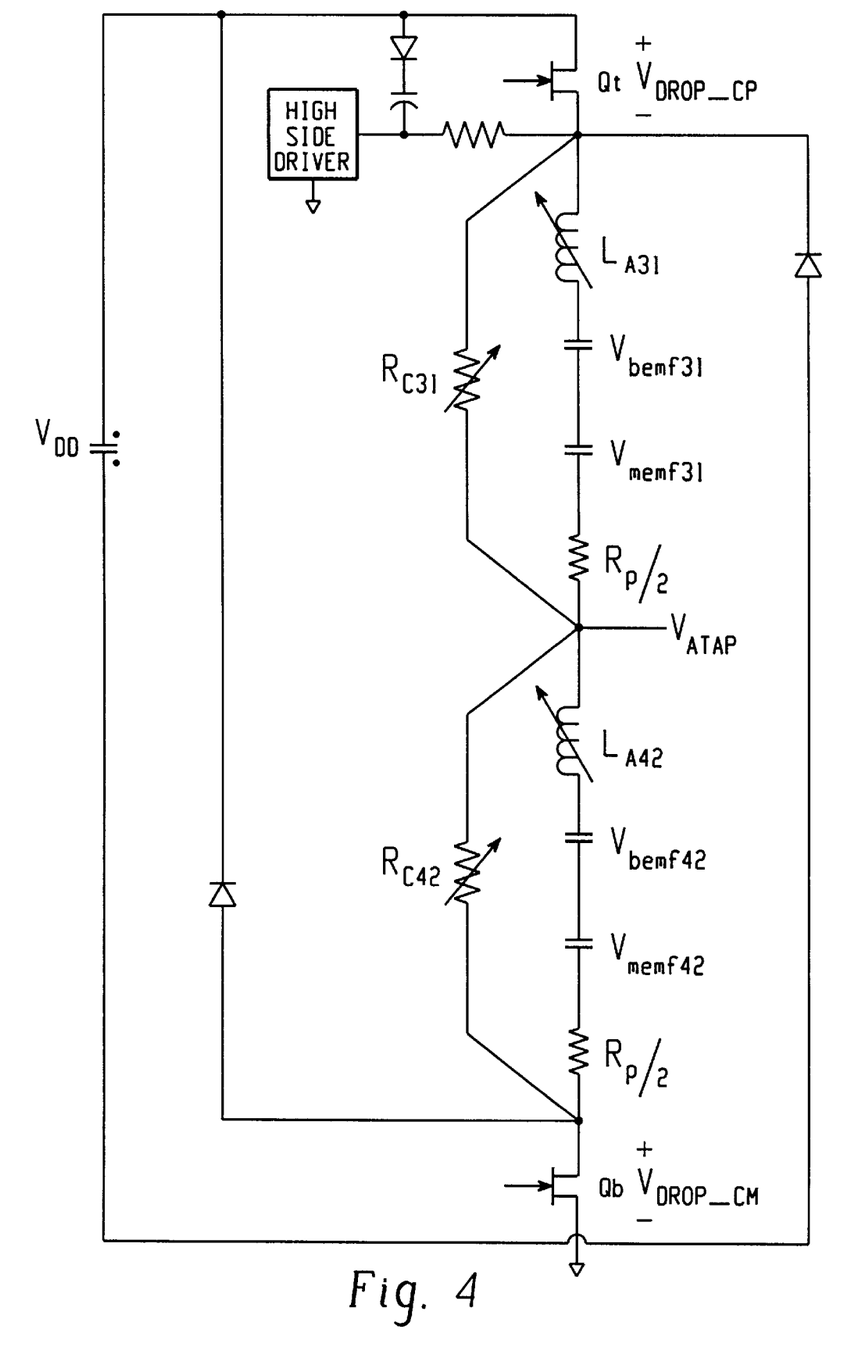
FIG. 4 is an alternative illustration of the phase equivalent circuit shown in FIG. 3.

FIGS. 3 and 4 provide schematics that account for all circuit components, and allow behavior of $V_{ATAP}$ to be predicted under various speeds, loads, temperatures, line voltages, manufacturing variations, and the like. In this regard, to properly utilize the tap voltages (e.g., $V_{ATAP}$ and $V_{BTAP}$) for sensorless control (or most other control methods), a mathematical model is utilized for the motor, which takes into account back emf (associated with self inductance/leakage flux), mutual emf (associated with mutual inductance/mutual flux), IR losses, cross coupling, and other effects beyond simply a pure inductance.

The schematics shown in FIGS. 3 and 4 provide two equivalent views of a circuit that accounts for all circuit components. With respect to FIG. 3, this circuit accounts for:
(a) eddy current and hysteresis losses (i.e., iron core losses) in the ferromagnetic core material ($R_{C31}$ and $R_{C42}$),
(b) the voltage drop across the chopping and commutation switches ($V_{DROP\_CP}$ and $V_{DROP\_CM}$),
(c) the voltage across "varying" inductors ($V_{A31}$ and $V_{A42}$),
(d) the back emf voltage induced in the rotor ($V_{bemf31}$ and $V_{bemf42}$), which is associated with leakage flux,
(e) the mutual emf voltage induced in the rotor ($V_{memf31}$ and $V_{memf42}$), which is associated with cross-linked flux of the other phase windings (i.e. phase B windings), and
(f) the voltage resulting from resistance in the phase windings ($V_{W31}$ and $V_{W42}$).

The variable "$\omega$" refers to the angular velocity (i.e., rotational speed), and the variable "$\lambda$" refers to the flux linkage. $\lambda=N\phi$, where $\phi$ is flux. The mathematical expressions for each of the voltage values for phase A is also shown in FIG. 3. It will be appreciated that FIG. 4 illustrates a circuit equivalent to FIG. 3, which simplifies the schematic by eliminating the equations shown in FIG. 3.

It should be understood that when the rotor is not rotating (i.e., $\omega=0$), the values for $V_{bemf31}$, $V_{bemf42}$, $V_{memf31}$ and $V_{memf42}$ will drop out. Moreover, if the currents $i_{A31}$, $i_{A42}$ and $i_{CA31}$ and $i_{CA42}$ are very low, then the values $V_{A31}$ and $V_{A42}$ will dominate. It should be further noted that $L=N\phi/i=\lambda/i$ (flux linkage/amp), where N is the number of turns of the coil, $\phi$ is the flux, i is the current (amps) and $\lambda$ is flux linkage. Accordingly, the term for $V_{A31}$ and $V_{A42}$ may be expressed as a function of flux linkage $\lambda$.

As can be observed from FIG. 3, $V_{ATAP}$ may be expressed as follows:

$$V_{ATAP}=L_{A42}di_{A42}/dt+i_{A42}[\omega dL_{A42}/d\theta]+i_{A42}R_P+V_{DROP\_CM}+\text{loss component};$$

or $$V_{ATAP}=L_{A42}di_{A42}/dt+i_{A42}[dL_{A42}/dt]+i_{A42}R_P+V_{DROP\_CM}+\text{loss component}$$

To extract position information from this signal requires solving the equation for $\theta$. Unfortunately, the equation is non-linear, since L is a function of position, and position varies with time. Therefore, a simplification of the equation needs to occur in order to solve the equation in a real time environment. Accordingly, general operation of the motor can be viewed in basic three operating modes, namely:

1. Stall/Startup Mode: In this mode, the terms including angular velocity $\omega$ are eliminated, since $\omega=0$. However, the core losses in the ferromagnetic material (i.e., iron) cannot be entirely neglected. The present invention is particularly well suited to obtain position data in the stall/startup mode.

2. Slow Speed Mode: In this mode, the voltage terms that include angular velocity $\omega$ are small, as compared to the voltage term defined by Ldi/dt. Also, in the case of slow speed, pulse width modulation (PWM) duty cycles will be relatively short. Consequently, the currents are typically lower, making the voltage term defined by iR/2 a small value, as compared to the voltage term defined by Ldi/dt. In this mode of operation, a low-cost microcontroller can lookup the position as a function of tap voltages and produce an encoder signal directly. The tap voltages may be sampled during the naturally firing of the phases (e.g., measure phase A tap voltage when phase A is energized and measure phase B tap voltages when phase B is energized), or alternatively, a signal could be injected into the inactive phase, so that the both phases are energized simultaneously.

3. Fast Speed Mode: In this mode, the voltage terms for back and mutual emf also need to be evaluated; however, the voltage terms defined by Ldi/dt will be comparably small. It is further noted that the PWM duty cycle will have a relatively longer duration. Since the motor is operating at high speed, a few encoder transitions can be made before the new speed is updated, therefore the microcontroller can operate as a background processor, calculating a new encoder duty cycle, and updating as needed. As indicated above, the tap voltages may be sampled during the naturally firing of the phases (e.g., measure phase A tap voltage when phase A is energized and measure phase B tap voltages when phase B is energized), or alternatively, a signal could be injected into the inactive phase, so that both phases are energized simultaneously.

Figure 5:
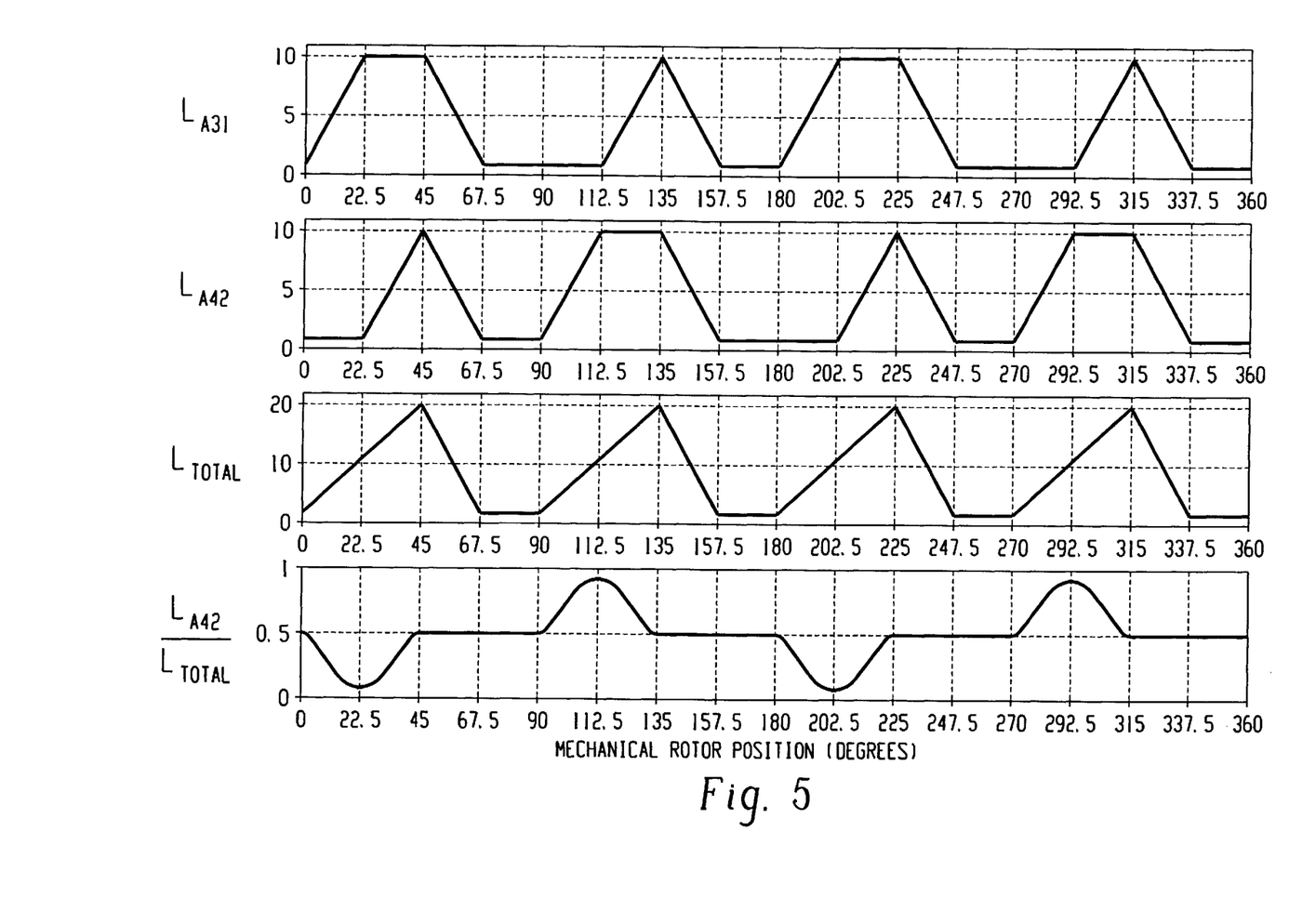
FIG. 5 shows waveforms illustrating ideal inductances and inductance ratios for an SR machine as shown in FIG. 1.

FIG. 5 shows waveforms illustrating ideal inductances for $L_{A31}$, $L_{A42}$ and $L_{TOTAL}$, at rotor positions 0–360 degrees of SR machine 5. $L_{TOTAL}$ is the sum of the inductances $L_{A31}$ and $L_{A42}$. Also shown is a waveform illustrating the ratio of $L_{A42}/L_{TOTAL}$. As indicated above, if only inductances are consider under ideal conditions, $V_{ATAP}$ can be expressed as $V_{BUS}(L_{A42}/L_{TOTAL})$. Consequently, if the phase A windings and phase B windings of SR machine 5 were measured with the same applied voltage in both phases winding, rotor position can be determined simply by comparing respective phase tap voltages ($V_{ATAP}$ and $V_{BTAP}$) to zero. If $V_{ATAP}$ is positive, then the rotor is determined to be positioned in a first quadrant, if $V_{BTAP}$ is positive, then the rotor is determined to be positioned in a second quadrant, etc. It should be understood that a quandrant is considered to be the span of mechanical degrees an encoder would be in either a high or low state in order to commutate the phase windings.

It should be noted that for "staggered tooth" or other "irregular pole configurations" machine designs, costly current/flux sensors are not needed to implement the present invention. In this regard, tap voltages (e.g., $V_{ATAP}$ and $V_{BTAP}$) are brought out of the center of the phase winding and measured with a simple voltage measuring device, e.g. an Analog-to-Digital Converter (ADC). This tap voltage naturally varies with the impedance of the winding.

As indicated above, in order to accurately predict the behavior of $V_{ATAP}$ under startup or stall conditions (and thus identify the position of the rotor), the core losses in the ferromagnetic material (i.e., iron) must be considered, since it will significantly distort the ideal waveforms shown in FIG. 5. Therefore, in accordance with a first aspect of the present invention, the position of a rotor which is in a stall or startup condition is determined by using a rotating "flux vector." In this regard, a method is employed to identify the rotor position without moving the rotor by utilizing the rotating flux vector. The term "flux vector," as used herein, refers to a set of data values (e.g., voltage, current or flux values) that define a flux distribution, pattern or position, as will be described in further detail below. The flux vector will "rotate" as differing levels of voltage are applied to the phase windings.

In accordance with a preferred embodiment of the present invention, a "rotating" flux vector is set up in the motor's rotor by simultaneously energizing (i.e.,firing) two phases while the rotor remains stationary, wherein each phase may be energized by the same or different voltages. The respective tap voltages ($V_{ATAP}$ and $V_{BTAP}$) are then recorded at this flux position. Then, another voltage excitation is applied to the two phases (each phase fired at the same or different voltages), causing a new flux position to occur. Once again, the respective tap voltages ($V_{ATAP}$ and $V_{BTAP}$) are recorded. This can be repeated for various rotations of the motor's flux. Moreover, it should be appreciated that in addition to tap voltages, current sensors or flux sensors are also suitable for determining the position of the rotor, without actually moving it. A suitable current sensor may take the form a resistor located in the phase winding, while a suitable flux sensor may take the form of separate coils mounted to the stator poles. Current sensors and flux sensors are particularly suitable for use in connection with regular or standard pole configurations. In addition, improved resolution can be provided by obtaining a slope value, a rate of change of the slope value, or the like, as will be explained in further detail below.

It should be understood that voltage pulse width modulation (PWM) or "chopping" may be necessary to control the current in accordance with the present invention. In this regard, if the phase current resulting from the excitation voltage reaches too high a level, the rotor will begin to rotate due to torque tending to move the rotor in such a direction as to increase the inductance. Therefore, the excitation voltage levels must be maintained at low enough level, that the voltage is insufficient to put the rotor in motion. By pulsing the voltage, the current can be maintained at a level which will not cause rotation. Voltage-PWM may be carried out by leaving one transistor ON (e.g., Q2 in FIG. 2), and to switch the other transistor (e.g., Q1 in FIG. 2) ON and OFF at a high frequency with a fixed duty-cycle $d=t_{ON}/T$, where $t_{ON}$ is the on-time and T is the period of the chopping frequency. Therefore, when Q1 is ON, $V_{DD}$ is applied to the phase winding. When Q1 is OFF, the winding is short circuited through Q2 and diode D2. Accordingly, the average voltage applied to the phase winding is $dV_{DD}$. It should be noted that in some cases PWM may not be necessary to apply the desired voltage.

Furthermore, it should be noted that if the phase windings are energized for too long, rotor movement may occur, and the machine will need a delay before starting, which is not desirable. Therefore, the excitation voltage should be applied to the phase windings only long enough to take voltage tap readings.

Set forth below is a summary of the method of the present invention, in accordance with a preferred embodiment:

1. Turn ON Phase A PWM channel with a 127 count out of 128 count on-time, and simultaneously turn ON Phase B PWM channel with a 127 count out of 128 count on time. Allow flux to build up (approximately 100–200 msec), in accordance with the current rise. Measure the tap voltages ($V_{ATAP}$ and $V_{BTAP}$) of each phase after the flux build up. As the current rises, the tap voltages will reach a level which allows an 8-bit ADC to provide suitable measurements. Other means of measuring tap voltages (e.g., a 16-bit ADC, or analog circuitry) may not require as great a current rise to make suitable measurements or provide the desired resolution. It should be appreciated that the tap voltages may be measured at both (1) transistor turn off, and (2) 2 µs after transistor turn off to obtain a slope value. Use of a slope value will result in improved accuracy. Accordingly, four measurements (i.e., 2 for each phase) are utilized to determine rotor position. Further accuracy can be obtained by obtaining enough tap voltage values to determine the rate of change of the slope.

2. Turn ON Phase A PWM channel with a 2 count out of 128 count on-time, and simultaneously turn ON Phase B PWM channel with a 3 count out of 128 count on-time. Allow flux to build up (approximately 100–200 msec .) Measure the tap voltages of each phase ($V_{ATAP}$ and $V_{BTAP}$) after the flux build up. As indicated above, the tap voltages may be measured at both (1) transistor turn off, and (2) 2 µs after transistor turn off in order to obtain a slope value.

3. Look up a position in a table: For the simpler case of only creating two flux vectors (a "127—127" and a "2-3"), the eight measurements (i.e., a set of 4 tap voltages for each flux vector, resulting from slope measurements) are input to thresholding circuitry which applies a regression technique to evaluate position, as will be explained in further detail below. If ratios of the eight measurements are used, variations due to line voltages and load can be partially eliminated. Alternatively, the eight measurements can be used as an index into a lookup table to determine rotor position.

4. If greater accuracy is needed, line voltage and current measurements can be used to scale the eight measurements before inputting the data to thresholding circuitry, or indexing into the lookup table. However, this would require more sensors than simply the two tap voltages. (Usually, the drive will have bus voltage and bus current sensors for normal operation, and these can be shared for the identification). Greater accuracy can also be obtained by creating additional flux vectors by obtaining additional tap voltage values at other PWM duty cycles.

It should be appreciated that the low current levels provided by the voltage-PWM will produce flux in the phase windings, but will not cause rotation of the rotor. The flux produced in phase windings A and phase windings B will vary as a function of the inductance of the phase winding and the phase current. Since the rotor does not rotate, the inductance will remain constant for each phase. In addition, the phase winding current will remain generally constant during the period of evaluation. Therefore, the flux associated with each phase winding will correspond to a rotor position providing an associated inductance.

Figure 6:
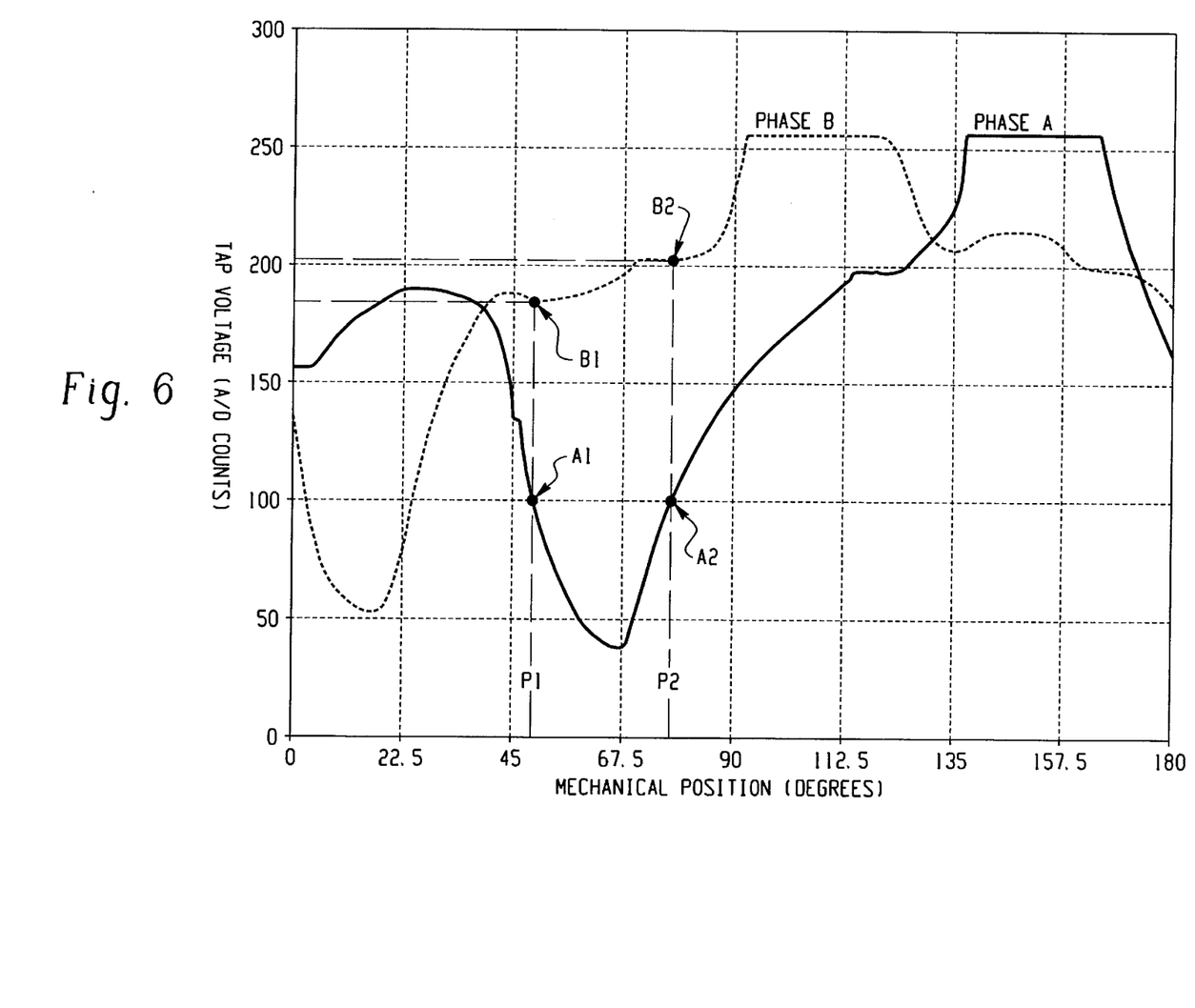
FIG. 6 illustrates actual measured tap voltages (at positions 0 thrum 180) as recorded by an Analog-to-Digital Converter (ADC), wherein phase A and phase B windings are energized simultaneously at a first voltage level.

The method of the present invention will now be described in further detail with reference to FIGS. 6–8. FIG. 6 illustrates tap voltages for the phase A and phase B windings in ADC counts, using an 8-bit ADC. The waveforms show the tap voltages when both the phase A and phase B windings are energized simultaneously with a voltage-PWM duty cycle of a 127 count out of 128 count on-time. A 0.5 Volt tap voltage corresponds to an ADC count of approximately 200 counts. Since an 8-bit ADC is used, the maximum measurable tap voltage is at 256 counts. As a result, the phase A and phase B curves max out at 256 counts. This figure shows the resulting tap voltage measurements for rotor positions 0–180 degrees. It should be noted that circuit components (namely, the loss component due to eddy currents and hysteresis), plus the non-linearities and quantization errors of the tap measuring device (i.e., ADC and sample and hold circuits, which will be described in further detail below), distorts the ideal tap voltage which would be derived from the waveforms of FIG. 3.

It should be appreciated that the energization voltage is applied by operation of the switches of the controller circuit (FIG. 2). It should be understood that the controller circuit of FIG. 2 is merely exemplary, and that the controller circuit may take many other suitable forms known to those skilled in the art.

At rotor positions P1 and P2 of FIG. 6, it can be observed that points A1 and A2, and points B1 and B2 will yield a set of very similar tap voltages (i.e., ADC counts). Therefore, it is very difficult to accurately distinguish between these rotor positions using only one phase A tap voltage and one phase B tap voltage. Accordingly, a second set of phase A and phase B tap voltages is obtained, wherein the phase A and phase B windings are energized simultaneously at different tap voltages levels.

Figure 7:
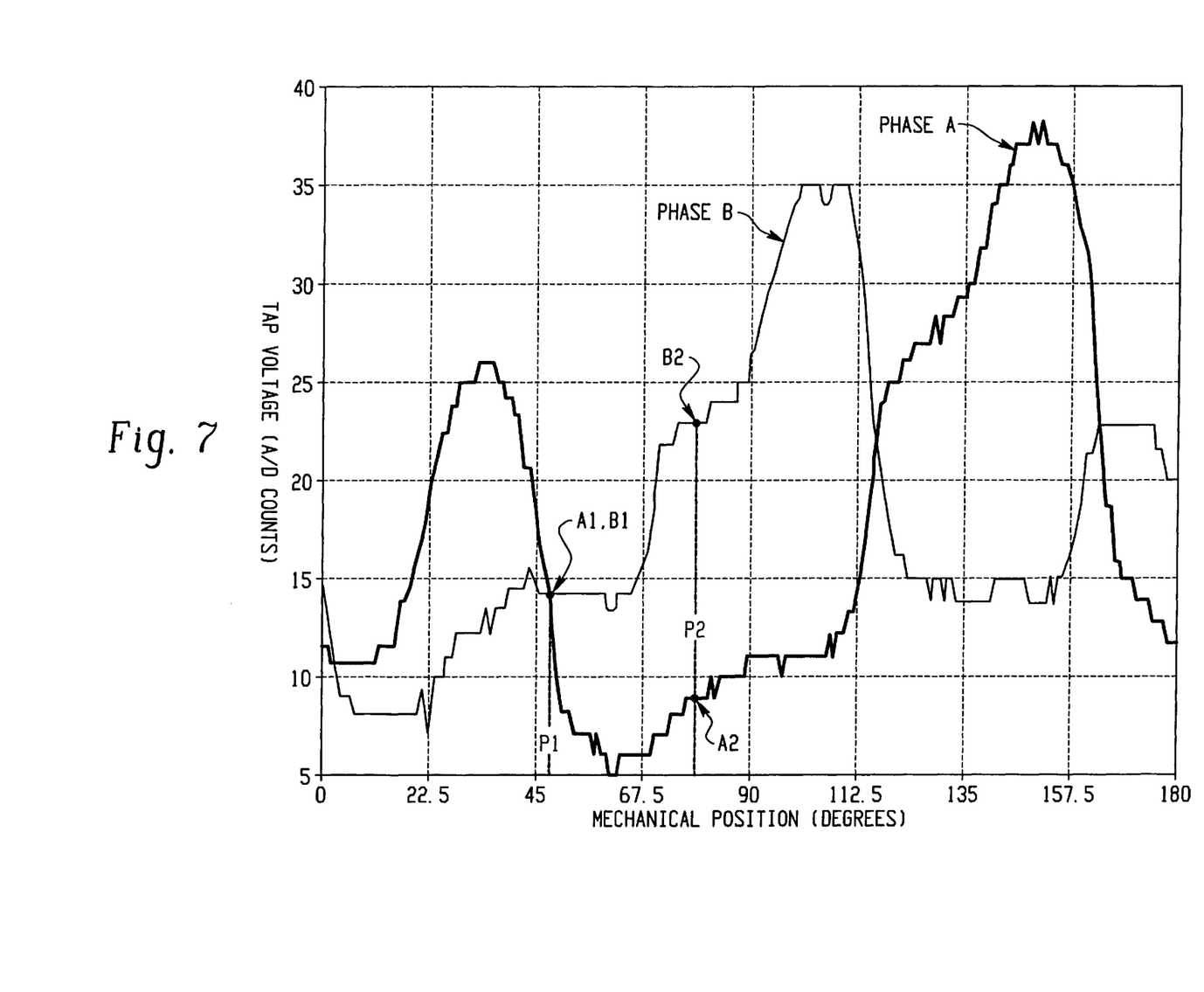
FIG. 7 illustrates actual measured tap voltages (at rotor positions 0 thru 180 degrees) as recorded by an Analog-to-Digital Converter (ADC), wherein phase A and phase B windings are energized simultaneously at respective second and third voltage levels, wherein the second and third voltage levels are lower than the respective first voltage levels of FIG. 6.

In FIG. 7, the phase A windings are energized at a voltage-PWM duty cycle of a 2 count out of 128 count on-time, while the phase B windings are energized at a voltage-PWM duty cycle of a 3 count out of 128 count on-time. Therefore, a much lower energization voltage is applied to the phase windings in FIG. 7. At the positions P1 and P2, points A1, B1 and A2, B2 yield a significantly different set of tap voltages (i.e., ADC counts). The position of a rotor can be accurately determined (i.e., proper quadrant determination can be made) utilizing the tap voltages at different energization levels, as derived from the waveforms shown in FIGS. 6 and 7. It should be understood that the number of quadrants is a function of the number of stator poles. Therefore, if there are 8 stator poles, there will be 8 quadrants of 45 degrees.

As indicated above, to enhance accuracy, it may be desirable to obtain tap voltages at additional energization voltage levels (i.e., obtain additional points from additional waveform curves).

Moreover, it should be appreciated that the selected energization voltage levels and the selected energization voltage ratios of the phase windings described herein have been chosen solely for the purpose of illustrating a preferred embodiment of the present invention. In this regard, these voltage levels and ratios can be varied to prevent shaft rotation and enhance accuracy. One method for selecting suitable energization voltage levels and energization voltage ratios is to energize the phase windings at a voltage level which causes the rotor to just begin rotating, and then reducing the voltage level by about 10%. Several different voltage levels are used, and the obtained results can be evaluated by plotting graphs (e.g., a 3D plot) to obtain a desired resolution. It should be noted that the results obtained will vary due to the physical properties of the machine.

It should be further appreciated that while the present invention has been described with particular reference to a 2-phase machine, the concepts embodied herein are suitably extended to a machine having more than 2 phases. In such cases it may be necessary to obtain flux vectors associated with more than two phases in order to determine rotor position. For instance, in the case of a 3-phase machine three sets of tap voltage data would be obtained (i.e., one set for each of phases A, B and C). Likewise, for the case of a 4-phase machine four sets of tap voltage data would be obtained (i.e., one set for each of phases A, B, C and D). Moreover, it should be noted that rotor position may be determined in some cases by obtaining only a single flux vector, such as in a machine configuration having variable permeability throughout each degree of rotation.

Figure 8:
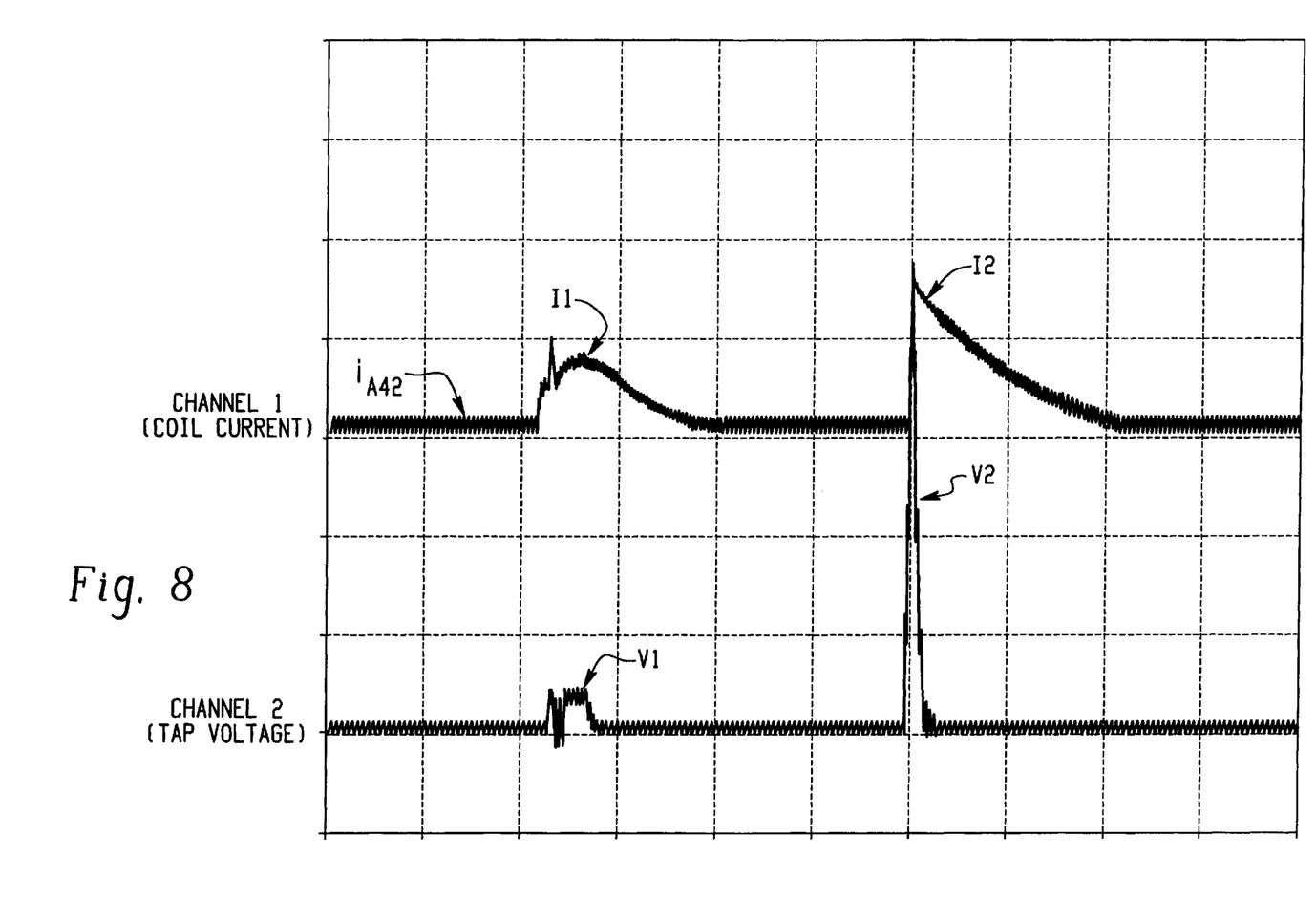
FIG. 8 illustrates actual phase winding currents and corresponding measured tap voltages, resulting from energization of a phase winding at both a relatively low voltage level and a relatively high voltage level.

FIG. 8 illustrates the current applied to the phase A windings, and the corresponding tap voltage, at one position of the rotor. In particular, I1 is the current waveform resulting from a 2 count duty cycle, and V1 is the waveform corresponding tap voltage. I2 is the current waveform resulting from a 127 count duty cycle. A first tap voltage will be measured at the peak of I1. As indicated above, it may be desired for the purpose of greater accuracy, to determine the slope of the tap voltage or determine the rate of change of the slope. In this case, one or more additional tape voltage measurements are taken at a time (e.g., 2 microseconds) after the peak of I1. As can be observed form FIG. 8, significantly different coil currents levels will result in significantly different tap voltage waveforms.

Figure 9A:
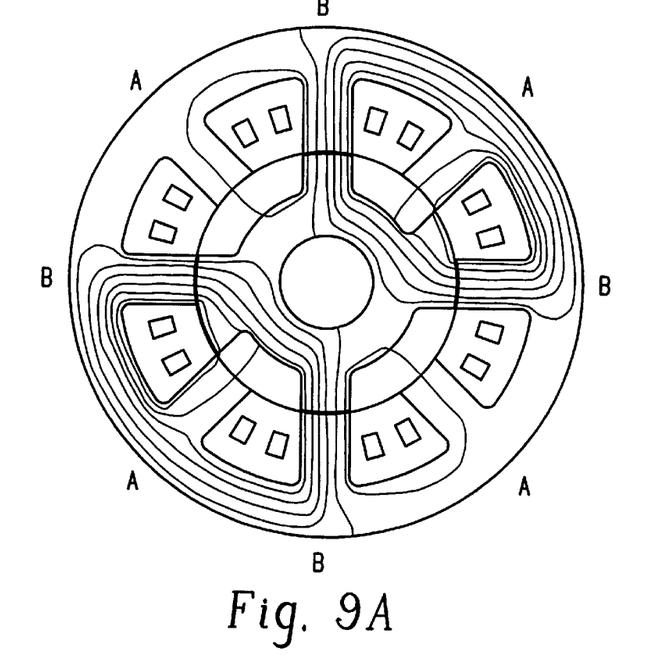
FIG. 9A illustrates a flux distribution resulting from simultaneous energization of phase A and phase B windings, wherein the voltage energizing the phase A winding is twice as large as the voltage energizing the phase B winding.
Figure 9B:
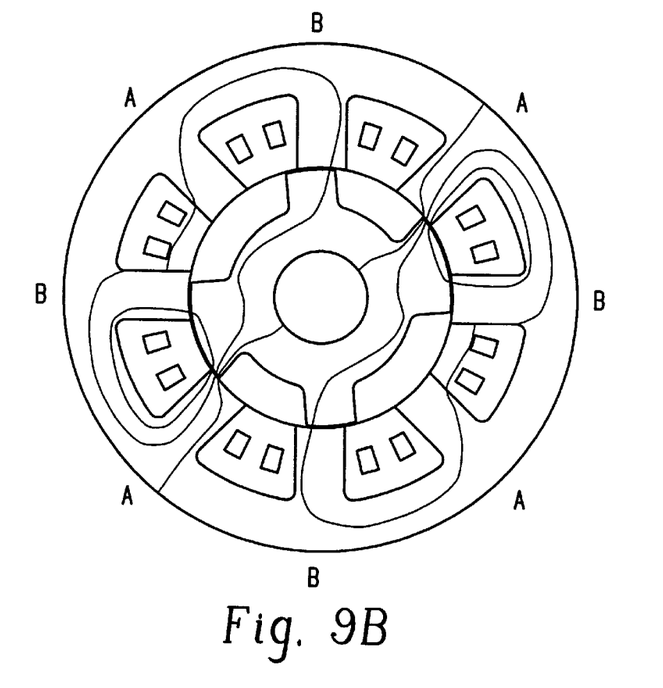
FIG. 9B illustrates a flux distribution resulting from simultaneous energization of phase A and phase B windings, wherein the voltage energizing the phase A winding is twelve times as large as the voltage energizing the phase B winding.

FIGS. 9A and 9B provide insight into the flux distribution in an SR machine. In this regard, FIGS. 9A and 9B show the SR machine with phase A and phase B windings energized simultaneously, but with a different amount of current. The respective phase A and phase B windings are labeled A and B. In particular, FIG. 9A illustrates a flux distribution resulting from simultaneous energization of phase A and phase B windings, wherein the voltage energizing the phase A winding is twice as large as the voltage energizing the phase B winding. FIG. 9B illustrates a flux distribution resulting from simultaneous energization of phase A and phase B windings, wherein the voltage energizing the phase A winding is twelve times as large as the voltage energizing the phase B winding. Without physical rotation of the rotor, the flux can be caused to move, providing a means for position identification with a stationary rotor.

Figure 10:
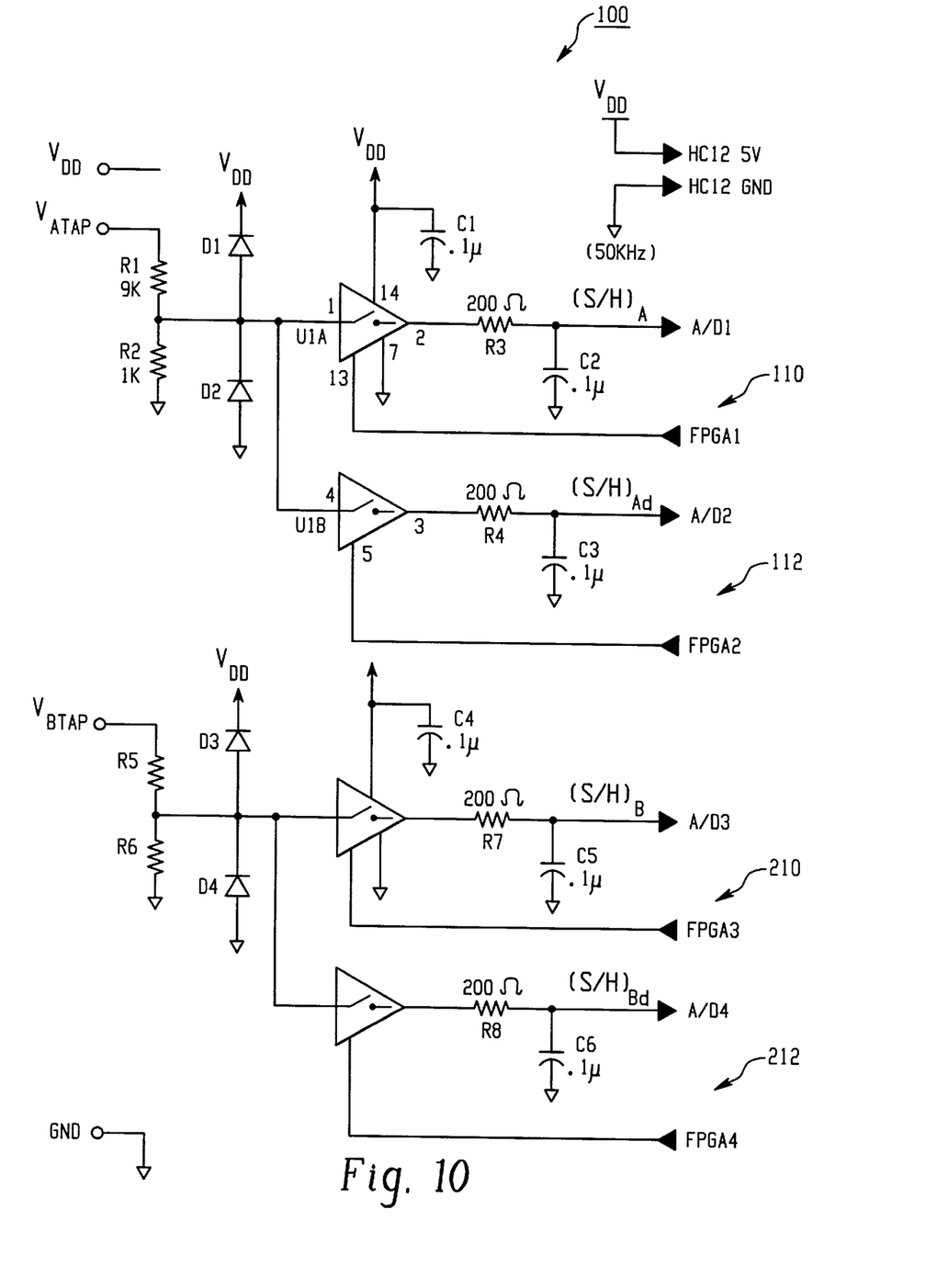
FIG. 10 is a schematic of a rotor position detection circuit, in accordance with a preferred embodiment of the present invention.

Turning now to FIG. 10, there is shown a schematic of a rotor position detection circuit 100, in accordance with a preferred embodiment of the present invention. It will be appreciated that rotor position detection circuit 100 shown in FIG. 10 merely illustrates a preferred embodiment of the present invention. In this respect, position detection circuit 100 may take numerous other suitable forms, including circuit arrangements which incorporate a microprocessor or additional analog circuitry.

Position detection circuit 100 includes a phase A sample and hold circuit 110, a "delay" phase A sample and hold circuit 112, a phase B sample and hold circuit 210, and a "delay" phase B sample and hold circuit 212. It should be understood that "delay" phase A and phase B sample and hold circuits 112, 212 are provided to sample the input tap voltage at a predetermined time delay (e.g., 2 microseconds) after the phase A and phase B sample and hold circuits 110, 210 sample the input tap voltage.

Accordingly, a slope value for the tap voltage can be determined. This provides greater resolution and reliability (e.g., greater noise immunity), as discussed above. However, the use of a "delay" sample and hold circuit may not be necessary to suitably implement the present invention.

Respective field programmable gate arrays FPGA1, FPGA2, FPGA3 and FPGA4 (not shown) are input to the sample and hold circuits 110, 112, 210, and 212. The field programmable gate arrays provide a switching signal, which causes the respective sample and hold circuit to sample the input tap voltage. Sample and hold circuits 110 and 210 are activated by the switching signals when the phase windings are energized.

The output of the sample and hold circuits 110, 112, 210 and 212 are respectively input to 8-bit ADCs A/D1, A/D2, A/D3 and A/D4 (not shown). The output of the ADCs is evaluated by thresholding circuitry (not shown), or alternatively used as an index to a lookup table (not shown), in order to determine rotor position. It will be appreciated that other techniques for evaluating the outputs of the ADCs are also suitable.

In accordance with a preferred embodiment of the present invention, the thresholding circuitry takes the form of a microcontroller. Reference data is stored in the memory of the microcontroller indicative of the position of the rotor. The thresholding circuitry applies a regression technique to determine a first delta ($\Delta_1$) by subtracting the output value of A/D2 from the output value of A/D1, and determine a second delta ($\Delta_2$) by subtracting the output value of A/D4 from the output value of A/D3. A third delta ($\Delta_3$) is determined by subtracting $\Delta_2$ from $\Delta_1$. This third delta ($\Delta_3$) is compared to a reference value (e.g., $0.5V_{DD}$), or used as an index to a lookup table.

Alternatively, a lookup table stores a rotor position value (θ), and at least a first and second pair of reference phase A/phase B tap voltage values. If "tap voltage" slopes are measured, then the reference phase A/phase B tap voltage values are replaced by reference phase A/phase B tap voltage slope values. The lookup table may store other data, in accordance with alternative embodiments discussed above.

It should be appreciated that in an alternative embodiment of the present invention, the tap voltages could be directly input to the ADCs. However, the use of sample and hold circuits is preferred because it provide a cleaner signal, thus reducing the effects of noise. As a result, better resolution is obtained with the sample and hold circuits.

The invention has been described with reference to a preferred embodiment. Obviously, modifications and alterations will occur to others upon a reading and understanding of this specification. For instance, while tap voltages have been utilized in the preferred embodiment of the present invention as a means for deriving rotor position data, it is also contemplated that current measurements may be suitably utilized to derive rotor position data, particularly in connection with salient pole machines having standard geometries. Alternatively, a current sensor or a flux sensor (e.g., in the form of a separate coils mounted to the stator poles) could be used as a means to derive the position data. It is intended that all such modifications and alterations be included insofar as they come within the scope of the appended claims or the equivalents thereof.

Having thus described the invention, it is now claimed:

1. A method for detecting the position of a rotor relative to the position of a stator, in a salient pole machine, comprising:
    simultaneously energizing a first and second phase winding with a respective first and second excitation voltage, wherein each said phase winding includes a plurality of coil sets;
    measuring a first pair of tap voltages respectively associated with a coil set of the first winding and a coil set of the second winding;
    simultaneously energizing the first and second phase winding with a respective third and fourth excitation voltage;
    measuring a second pair of tap voltages respectively associated with a coil set of the first winding and a coil set of the second winding; and
    determining a rotor position based upon said first and second pair of tap voltages.

2. A method according to claim 1, wherein said step of determining the rotor position includes:
    comparing said first and second pair of tap voltages to predetermined reference values, indicative of a known rotor position.

3. A method according to claim 1, wherein said first and second excitation voltages are approximately the same.

4. A method according to claim 1, wherein said third and fourth excitation voltages are approximately the same.

5. A method according to claim 1, wherein said first and second excitation voltages are higher voltages than both said third and fourth excitation voltages.

6. A method according to claim 1, wherein said first and second excitation voltages and said third and fourth excitation voltages are selected to obtain a unique set of first and second tap voltage pairs, to identify a rotor position.

7. A method according to claim 1, wherein said first, second, third and fourth excitation voltages respectively energize said first and second phase windings by voltage pulse width modulation (PWM).

8. A method according to claim 1, wherein said method further comprises the steps of:
    determining a first pair of slope values for each of said first pair of tap voltages; and
    determining a second pair of slope values for each of said second pair of tap voltages.

9. A method according to claim 8, wherein said step of determining a rotor position based upon said first and second pair of tap voltages, includes comparing said first and second pair of slope values to predetermined reference values, indicative of a known rotor position.

10. A method according to claim 1, wherein said rotor remains stationary in response to said first, second, third, and fourth excitation voltages.

11. A method for detecting the position of a rotor relative to the position of a stator, in a salient pole machine, comprising:
    simultaneously energizing a first and second phase winding with a respective first and second excitation voltage, to form a first flux pattern representable by a first flux vector;
    simultaneously energizing the first and second phase winding with a respective third and fourth excitation voltage, to form a second flux pattern representable by a second flux vector; and
    evaluating said first and second flux vectors to determine a rotor position.

12. A method according to claim 11, wherein said step of evaluating said first and second flux vectors includes:
    comparing said first and second flux vectors to predetermined reference values, indicative of a known rotor position.

13. A method according to claim 11, wherein said first and second excitation voltages are approximately the same.

14. A method according to claim 11, wherein said third and fourth excitation voltages are approximately the same.

15. A method according to claim 11, wherein said first and second excitation voltages are higher voltages than both said third and fourth excitation voltages.

16. A method according to claim 11, wherein said first and second excitation voltages and said third and fourth excitation voltages are selected to obtain a unique set of flux vectors, to identify a rotor position.

17. A system for detecting the position of a rotor relative to the position of a stator, in a salient pole machine, comprising:

switching means for simultaneously energizing a first and second phase winding with a respective first and second excitation voltage, wherein each said phase winding includes a plurality of coil sets;

sampling means for measuring a first pair of tap voltages respectively associated with a coil set of the first winding and a coil set of the second winding;

switching means for simultaneously energizing the first and second phase winding with a respective third and fourth excitation voltage;

sampling means for measuring a second pair of tap voltages respectively associated with a coil set of the first winding and a coil set of the second winding; and means for determining a rotor position based upon said first and second pair of tap voltages.

18. A system according to claim 17, wherein said sampling means includes a sample and hold circuit.

19. A system according to claim 17, wherein said sampling means includes an analog-to-digital converter.

20. A system according to claim 17, wherein said means for determining rotor position includes a lookup table including reference values indicative of known rotor positions.

21. A system according to claim 17, wherein said system further comprises:

means for determining a first pair of slope values for said first pair of tap voltages; and means for determining a second pair of slope values for said second pair of tap voltages.

22. A system according to claim 21, wherein said means for determining rotor position includes a lookup table including reference values, indicative of known rotor positions.

23. A system for detecting the position of a rotor relative to the position of a stator, in a salient pole machine having a plurality of phase windings, comprising:

first flux generation means for generating a first flux pattern representable by a first flux vector, by simultaneously energizing said plurality of phase windings with a first respective set of excitation voltages;

second flux generation means for generating a second flux pattern representable by a second flux vector, by simultaneously energizing said plurality of phase windings with a second respective set of excitation voltages; and evaluation means for evaluating said first and second flux vectors to determine a rotor position.

24. A system according to claim 23, wherein said first flux generation means simultaneously energizes a first and second phase winding with a respective first and second excitation voltage, and said second flux generation means simultaneously energizes the first and second phase winding with a respective third and fourth excitation voltage.

25. A system according to claim 23, wherein said evaluation means includes comparison means for comparing said first and second flux vectors to predetermined reference values, indicative of known rotor positions.

26. A system according to claim 24, wherein said first and second excitation voltages are approximately the same.

27. A system according to claim 24, wherein said third and fourth excitation voltages are approximately the same.

28. A system according to claim 24, wherein said first and second excitation voltages are higher voltages than both said third and fourth excitation voltages.

29. A system according to claim 24, wherein said first and second excitation voltages and said third and fourth excitation voltages are selected to obtain a unique set of flux vectors, to identify a rotor position.

30. A system according to claim 23, wherein said salient pole machine is a switched reluctance machine.

31. A system according to claim 23, wherein said salient pole machine is a synchronous machine.

32. A system according to claim 23, wherein said salient pole machine has an irregular pole configuration.

33. A system according to claim 23, wherein said salient pole machine has more than two phases.

34. A system according to claim 33, wherein said system further comprises a third flux generation means for generating a third flux pattern representable by a third flux vector, wherein said evaluation means evaluates said first, second, and third flux vectors to determine a rotor position.

35. A system for detecting the position of a rotor relative to the position of a stator, in a salient pole machine having N phase windings, where N is greater than 1, comprising:

switching means for simultaneously energizing two or more of said N phase windings with respective excitation voltages, wherein each said N phase winding includes a plurality of coil sets; and evaluation means for evaluating a plurality of flux vectors resulting from the simultaneous energizing of said two or more N phase windings with the respective excitation voltages, to determine rotor position.

36. A system according to claim 35, wherein said system further comprises sampling means for measuring tap voltages respectively associated with said plurality of coil sets, wherein said evaluation means determines the rotor position based upon said tap voltages obtained by said sampling means.

37. A system according to claim 36, wherein said sampling means includes a sample and hold circuit.

38. A system according to claim 36, wherein said sampling means includes an analog-to-digital converter.

39. A system according to claim 35, wherein said system further comprises at least one of: current sensing means for measuring current respectively associated with said plurality of coil sets, and flux sensor means for measuring flux respectively associated with each of said N phase windings.

40. A method for detecting the position of a rotor relative to the position of a stator, in a salient pole machine having N phases, where N is greater than one, comprising:

simultaneously energizing two or more of the N phases with respective excitation voltages, to form a plurality of flux patterns representable by a plurality of flux vectors; and evaluating said plurality of flux vectors to determine a rotor position.

41. A method according to claim 40, wherein said step of evaluating said one or more flux vectors includes:

comparing said one or more flux vectors to predetermined reference values, indicative of a known rotor position.

* * * * *